Dec. 30, 1952 L. C. ERICKSON 2,623,630
BELT TENSIONING MECHANISM FOR CONVEYERS
Filed April 24, 1950 3 Sheets-Sheet 1
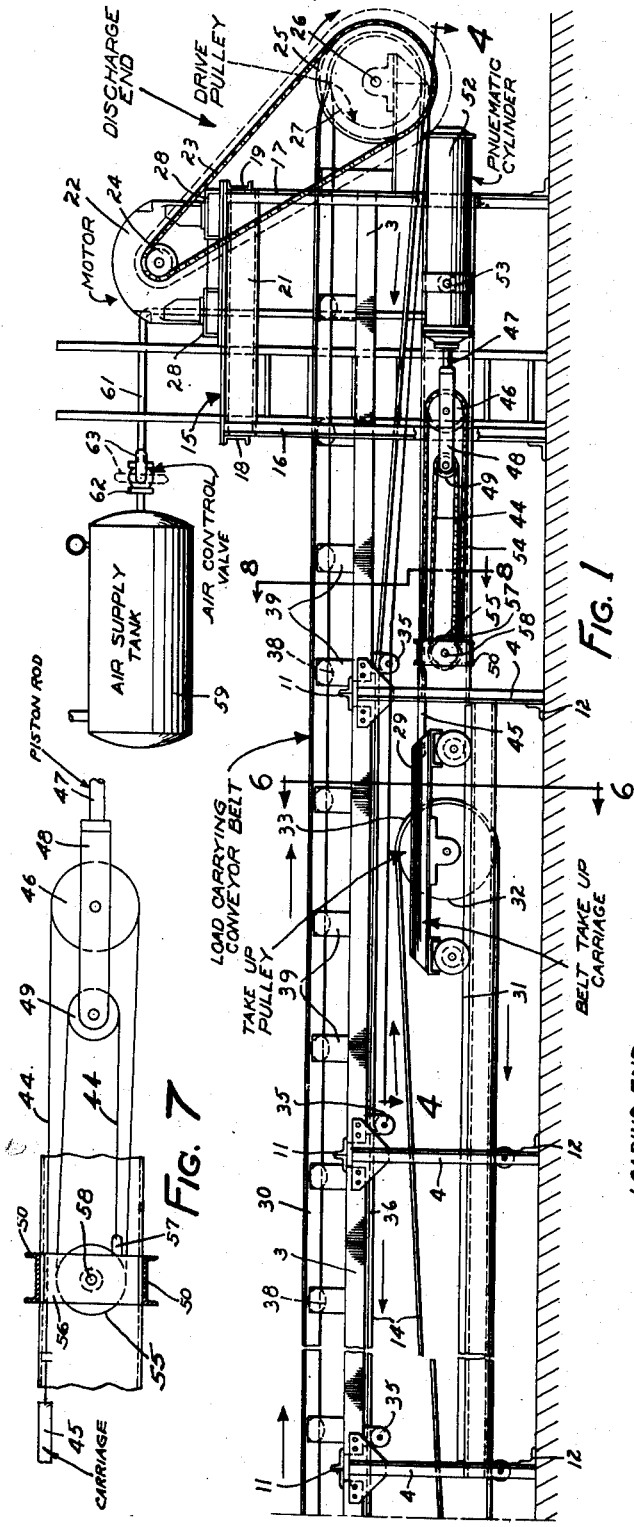
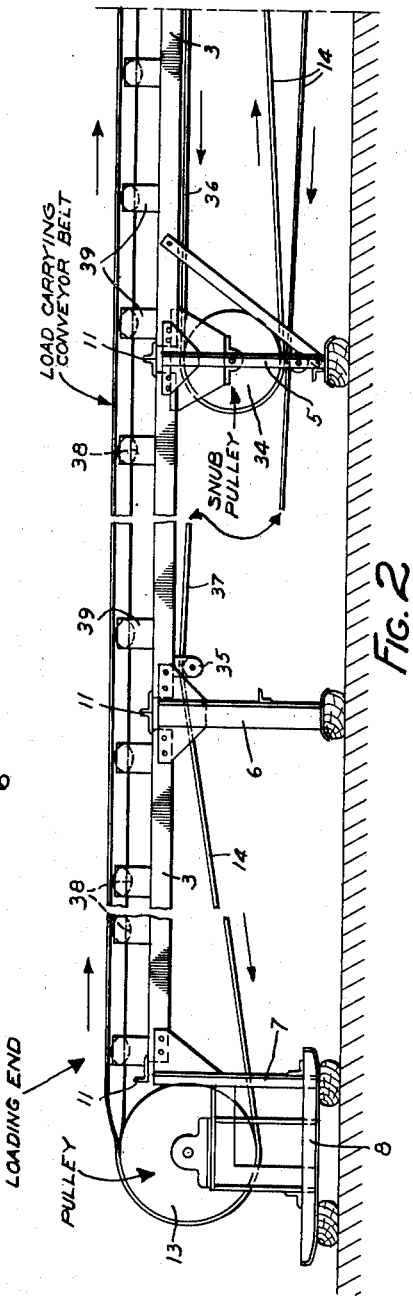
INVENTOR.
LEWIS C. ERICKSON
BY
Paul, Paul & Moore
ATTORNEYS Dec. 30, 1952          L. C. ERICKSON          2,623,630
BELT TENSIONING MECHANISM FOR CONVEYERS
Filed April 24, 1950          3 Sheets-Sheet 2
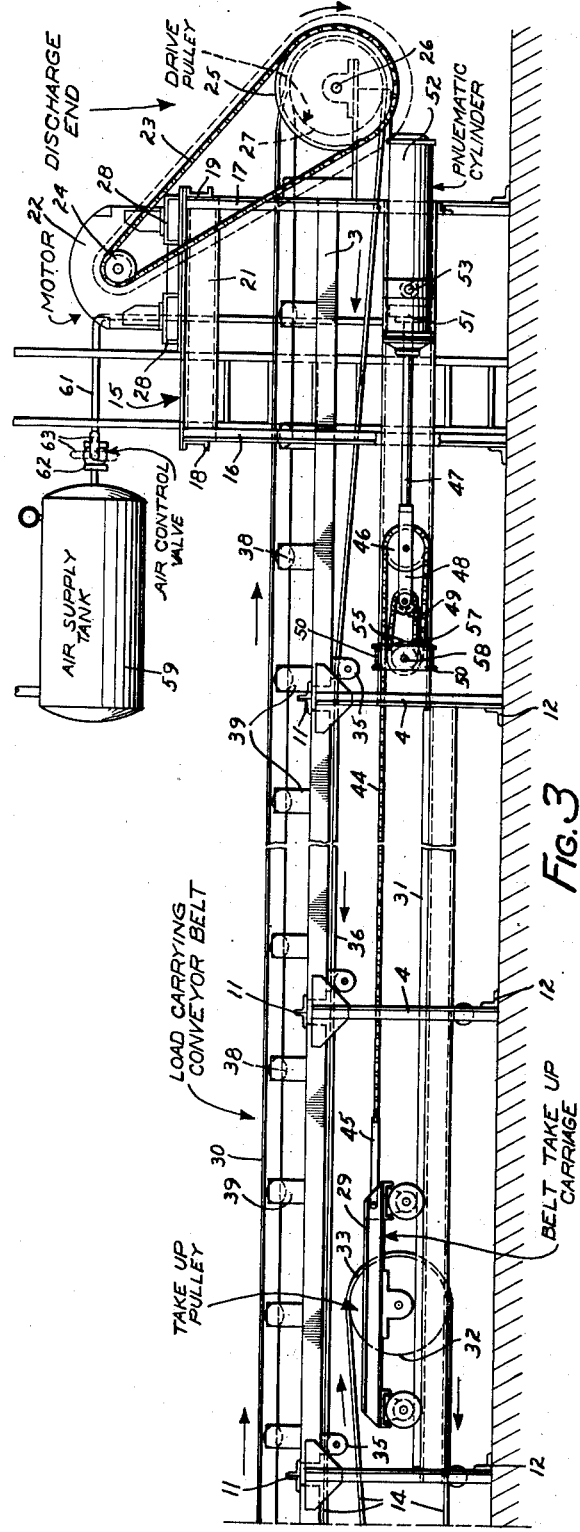
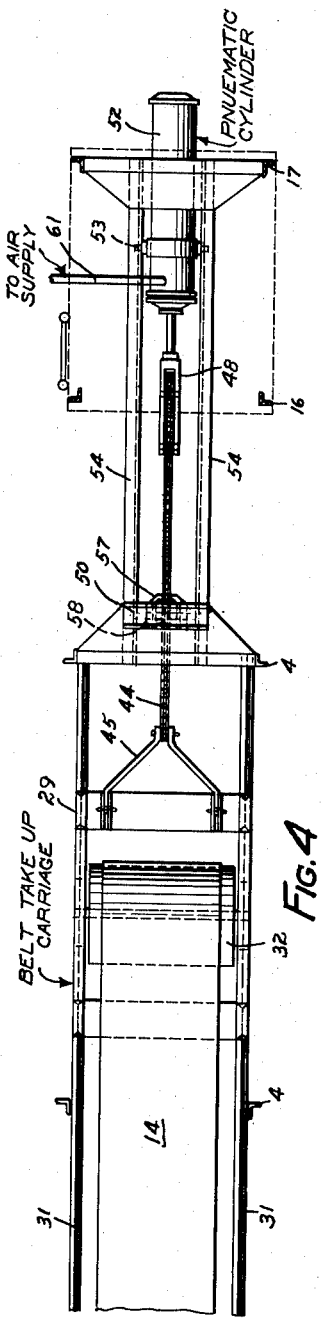
INVENTOR.
LEWIS C. ERICKSON
BY
    Paul, Paul & Moore
ATTORNEYS Dec. 30, 1952          L. C. ERICKSON          2,623,630
BELT TENSIONING MECHANISM FOR CONVEYERS
Filed April 24, 1950          3 Sheets-Sheet 3

INVENTOR.
LEWIS C. ERICKSON
BY Paul, Paul + Moore
ATTORNEYS

Patented Dec. 30, 1952

2,623,630

UNITED STATES PATENT OFFICE 2,623,630

BELT TENSIONING MECHANISM FOR CONVEYERS

Lewis C. Erickson, Duluth, Minn., assignor to National Iron Company, Duluth, Minn., a corporation of Delaware Application April 24, 1950, Serial No. 157,685

4 Claims. (Cl. 198—208)

This invention relates to new and useful improvements in endless belt conveyors, and more particularly to a novel mechanism for maintaining the tension in the belt substantially constant under all operating conditions.

The present invention is particularly applicable for heavy duty endless belt conveyors such as commonly used in the mining industry, but it is to be understood that the invention may be used in connection with heavy duty endless belt conveyors utilized in various other fields of industry. To simplify the description of the invention, there is illustrated in the accompanying drawings an endless belt conveyor such as are commonly used in the mining industry for conveying strippings or waste material from one place to another, or for conveying ore, coal, or other materials, capable of being handled on such a conveyor.

In the operation of extracting iron ore and the like from mines, particularly open mines, it is necessary to remove the top soil from the ore so that access may be had to the pay ore. The top soil, which may vary considerably in depth, is removed or stripped from the ore by the use of conventional equipment, such as power loaders, trucks, and the like, and is dumped onto a flat conveyor belt which may be of considerable length, depending upon the distance from the stripping operation to the stock pile, where the waste or top soil is dumped.

The effective length of such a conveyor may be one thousand or more feet, which means that the total length of the belting utilized in the conveyor may be two thousand or more feet.

The necessity for gravity tensioning becomes present whenever the belt stretch exceeds the practical limits of manual or screw type belt takeups. This can occur on any conveyor of a length of approximately one hundred feet or more, or which requires ten horse power or more to operate. The necessary tension of the slack or return side of the belt is a proportion of the tension in the load carrying side of the belt, due to drive torque, and tension in the slack side of the belt develops the friction on the drive pulley. Accuracy in the construction of large belt drives is therefore important in order to assure adequate friction with the lightest belt possible.

To assure maximum efficiency, the tension in the belt must be maintained substantially constant and sufficient to eliminate any possible danger of slippage of the belt upon the periphery of the drive pulley, when the conveyor is operating under a heavy load. From actual experience, it has been found that the average lineal stretch in the total length of the belting utilized in a conveyor approximately two thousand feet long, may be about two per cent of the length of the belting. Thus, in a conveyor of this size, the belt takeup mechanism may be required to take up approximately forty feet of belting, under certain operating conditions.

Belt tensioning mechanisms such as heretofore utilized for taking up the slack in endless conveyor belts and maintaining said belts at the proper operating tension, have not proven entirely successful, primarily because of their inherent construction. It is customary to use a belt takeup pulley mounted on a movable carriage or slide. Means is provided for constantly urging the belt takeup pulley in a direction to tension the belt, and such means has usually been in the form of a suitable counterweight suspended by a flexible cable operatively attached to the belt takeup pulley or to its supporting carriage, whereby the weight constantly urges the takeup pulley in a direction to tighten the belt. The weight may be mounted for vertical or horizontal movement, depending upon the nature of the conveyor installation. A vertically movable counterweight may be found extremely objectionable for underground belt installations, because of the space required for the up and down movement or travel of the belt tensioning weight.

There are other objections to the use of a heavy counterweight for tensioning the belt, and that is the force to overcome the inertia of such a counterweight when, for some reason, the belt takeup pulley is suddenly moved in one direction or the other. This is particularly true in high tension belt applications operated with a motor of one hundred or more horse power. The sudden load imparted to the belt, when starting such a belt system, may momentarily create a rapid movement of the belt takeup carriage until the slack in the belt has been completely taken up, or until the load carrying belt begins to travel at full speed. Where the belt takeup pulley carriage is mounted for horizontal movement, the problem of arranging space for the counterweight may not be difficult, as will be understood.

In belt conveyor installations of this general type, it is highly desirable that the means provided for tensioning the belt will operate automatically, whereby the tension in the belt is maintained substantially constant at all times during the operation of the conveyor. The novel pneumatic belt tensioning mechanism herein disclosed has been carefully designed to eliminate, so far as possible, all of the faults now inherent in belt tensioning devices of this general type now in common use. The entire mechanism, including the belt takeup pulley supporting carriage, the block-and-tackle mechanism, and the pneumatic cylinder, are so constructed and oriented that they require very little room and can normally be placed within the usual supporting structure of the conveyor belt, with only minor structural changes.

The belt takeup mechanism is very light in weight, and therefore requires no additional supporting structure. It is extremely simple and inexpensive in construction, and all moving parts are readily accessible, whereby they may readily and conveniently be serviced along with the usual servicing of the conveyor proper. The improved structure also eliminates the usual hazard always inherent in the counterweight form of belt tensioning mechanism, wherein a counterweight is suspended from a cable, and the supporting structure of which may require periodic lubrication.

The belt tensioning mechanism herein disclosed, because of its unique principle of operation, presents the utmost in simplicity, in that its construction is extremely simple and inexpensive, contains few parts, and all such parts being so arranged and connected that when the apparatus is in operation, a predetermined force is constantly applied to the belt takeup carriage to move it in a direction to maintain the belt at the proper working tension. The construction of the apparatus also makes it possible to readily make repairs and adjustments at any time by simply interrupting the air supply to the pneumatic cylinder or, if necessary, completely releasing the air therefrom, whereby its reciprocating piston may readily be lubricated or otherwise manipulated, as may be necessary, at times, to maintain the apparatus at maximum efficiency. In other words, by the simple manipulation of a single air control valve, the belt tensioning mechanism may be instantly rendered ineffective, should that be deemed necessary, whereas in a counterweighted installation, as hereinbefore referred to, considerable labor would be required to disconnect the counterweight from the takeup pulley supporting carriage, which, at the present time of high labor costs, might conceivably materially increase the cost of performing such operations upon the belt tensioning mechanism.

The block-and-tackle principle of operation makes it possible to provide an apparatus of this type which is very sensitive to variations in the tension of the belt, so that it will respond to slight variations in belt tension, and whereby the apparatus is constantly ready to instantly shift the position of the belt takeup pulley, should the belt, for some reason, momentarily tend to develop a slack condition. The number of sprockets and number of chain strands utilized in the belt takeup assembly may readily be varied to provide the most effective ratio between the relative traveling movements of the belt takeup carriage and the pneumatically operated member for imparting movement to the carriage, thereby to provide a highly efficient and practical apparatus for automatically maintaining an endless conveyor belt under a constant tension during all operating conditions.

An important object of the present invention therefore is to provide a pneumatically operated belt tensioning mechanism for automatically maintaining the tension in a heavy duty endless conveyor belt substantially constant at all times while in operation, and whereby the belt may always be operated at a tension directly proportional to the load being carried thereon.

A further object is to provide a belt tensioning mechanism based upon the principle of a conventional multiple block-and-tackle, but wherein the posts are disposed in reverse order to the usual arrangement of the parts of a conventional multiple block-and-tackle, whereby the travel of the piston rod which operates the carriage of the belt take up pulley is required to travel but a fraction of the distance traveled by the belt takeup carriage, and whereby the operating mechanism for said carriage may be made very compact so that it may readily be mounted within the usual supporting structure of the conveyor.

A further object is to provide an automatically operable belt tensioning mechanism which requires but a minimum of parts, and all of said parts being so constructed and oriented that the mechanism for constantly tending to move the belt takeup carriage in a direction to tension the belt may be readily stored in a comparatively small space, a highly advantageous attribute in an apparatus of this general type, whether utilized in a heavy duty conveyor operated underground or above ground.

A further object is to provide a belt tensioning mechanism comprising a belt takeup pulley supporting carriage mounted for traveling movement upon suitable rails and having one end of a flexible element secured thereto, the opposite end of which has running connections with a plurality of rotatable elements, one of which is secured to a fixed support and others to a movable support, and a pneumatically operated device having an operative connection with said rotatable elements and constantly tending to operate them in a direction to cause said flexible element to urge the belt takeup carriage in a direction to tension the belt.

A further object is to provide a belt tensioning mechanism comprising a plurality of sprockets having one end of a chain operatively mounted thereon, and the other end of said chain having a connection with the belt takeup carriage, and a pneumatically operated member having one end connected to the supporting means for said sprockets, whereby certain of said sprockets may be moved in a direction away from others of said sprockets in a manner similar to the movements of the sprockets of a conventional block-and-tackle, except that the block-and-trackle principle is operated reversely to the operation of a conventional block-and-tackle, thereby to impart relatively greater speed to the belt takeup carriage than is required of the pneumatically operated member for imparting traveling movement thereto.

A further object is to provide a pneumatically operated mechanism for automatically maintaining a conveyor belt under a constant tension, and which mechanism comprises a cylinder and piston, an air supply tank, and a conduit connecting the cylinder with the air supply tank whereby the pressure of the air in the cylinder and said tank are substantially equalized at all times except at the instant when the pressure may be increased in the air supply tank to cause the piston to be retracted in the cylinder, thereby to actuate the belt mechanism.

Other objects of the invention reside in the simplified construction of the belt takeup mechanism whereby it may readily be embodied in the usual supporting structure of a conventional endless belt conveyor without requiring expensive alterations thereto; in the provision of a single control element such as an air valve interposed in the air conduit connecting the cylinder with the air supply tank, which valve may be of the usual three-way type, whereby it may control the flow of air to the cylinder to operate the belt tightening mechanism, and whereby the valve may also be positioned to release the air from the cylinder to the atmosphere, thereby to render the belt tensioning mechanism inoperative, and also whereby the movable element of the control valve may be positioned to cause the air cylinder to be constantly in communication with the air supply tank.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevational view of the drive end of an endless belt conveyor showing the novel belt tensioning mechanism positioned to take up the maximum slack in the belt;

Figure 2 is a view showing the discharge end of the conveyor, and also showing the snub pulley mounted thereon;

Figure 3 is a view similar to Figure 1 with the belt tightening mechanism operated to permit the belt takeup carriage to assume a position at the opposite end of its travel;

Figure 4 is a sectional plan view on the line 4—4 of Figure 1, with some of the parts omitted;

Figure 7 is a diagrammatic view showing the "block and tackle" mechanism utilized for transmitting power from the piston rod to the carriage.

Figure 5:
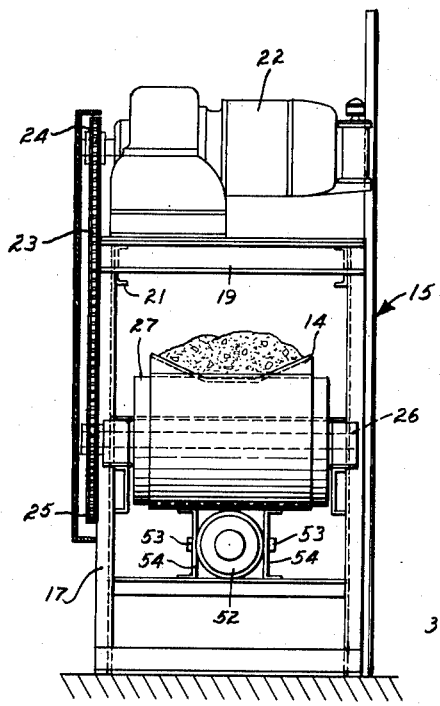
Figure 5 is an end view of the discharge end of the conveyor.

To afford a clearer explanation of the invention herein disclosed, there is illustrated in the accompanying drawing an endless heavy duty conveyor such as are utilized in iron and coal mines, and other places where it is found necessary to move large quantities of bulk or other material from one place to another. The supporting structure of the conveyor may be of more or less conventional design, and it is therefore believed unnecessary to describe in detail the various mechanism thereof.

Briefly, the conveyor frame is shown comprising longitudinally extending side frame members 3—3, preferably of channel cross section, and having their ends supported upon a plurality of upright posts 4, 5 and 6, and end posts 7, shown mounted upon suitable skids 8 to facilitate moving the receiving end of the conveyor about to facilitate delivering the material thereonto. The ends of the side frame members may be secured to the upright posts 4 by means of suitable gusset plates as is well known in such constructional work. Suitable cross members 11 secure together the side frame members at the upper ends of the legs 4, and similar cross members 12 are shown provided at the bottoms of the legs.

An idler pulley 13 is mounted on the carriage or skid 7 at the receiving end of the conveyor and supports one end of an endless belt 14. The opposite or discharge end of the conveyor is shown provided with an upright structural frame, generally designated by the numeral 15, comprising uprights 16 and 17 suitably secured to the side rails 3—3 to support said frame members at the discharge end of the conveyor. Suitable cross members 18 and 19 are shown provided at the upper ends of the uprights 16 and 17 and cooperate with upper side frame members 21 to provide a rugged and substantial frame structure adapted to support the drive means for the conveyor, such as the motor 22, belt chain or belt 23, and the sprockets 24 and 25 upon which the chain 23 is mounted. The sprocket 24 may be secured directly to the shaft of the motor 22 for direct rotation therewith, and the sprocket 25 is secured to a shaft 26 upon which is mounted the drive pulley 27 which operates the conveyor belt 14, as best illustrated in Figure 5.

The motor 22 is shown mounted upon rails 28 which may constitute a portion of a structural frame 15. Suitable means, not shown, is provided for maintaining the drive belt 23 at the required operating tension.

One of the important features of the present invention resides in the means provided for maintaining a constant driving connection between the conveyor belt 14 and the drive pulley 27, thereby to eliminate slippage between the drive pulley and belt under all operating conditions.

Conveyors of this general type, particularly those used in the mining industry, are frequently subjected to very rough usage because of the condition of the material which is to be transported. The material, which may greatly vary in composition and texture may, at times, contain considerable moisture or water which in some cases may cause the material to adhere to the periphery of the pulleys and thus interfere more or less with the operation of the belt, particularly if the belt is not maintained at the proper tension.

The novel belt tensioning mechanism herein disclosed is shown comprising a carriage 29 mounted for horizontal traveling movement upon suitable rails 31 secured to the upright posts 4 of the conveyor frame, as shown in Figures 1 and 2. A belt takeup pulley 32 is mounted on the carriage 29 and has a running connection with a loop 33 formed in the lower run of the belt 14, as best illustrated in Figure 1. The upper run of the belt loop 33 passes around a snub pulley 34, shown mounted in bearings secured to a pair of the upright posts 5 of the belt supporting structure or frame, as best shown in Figure 2, and said belt run then passes around the drive pulley 27 at the discharge end of the conveyor, as shown in Figures 1 and 3. The bottom run of the belt loop 33 continues on towards the receiving end of the conveyor where it passes around the pulley 13 to form the load carrying portion of the conveyor belt 14. Suitable idler rollers 35 are provided beneath the side frame members 3—3 for maintaining the belt runs 36 and 37 in proper relation to said frame members and whereby the various sections of the composite conveyor belt will not engage one another, as clearly illustrated in Figures 1, 2 and 3.

Figure 6:
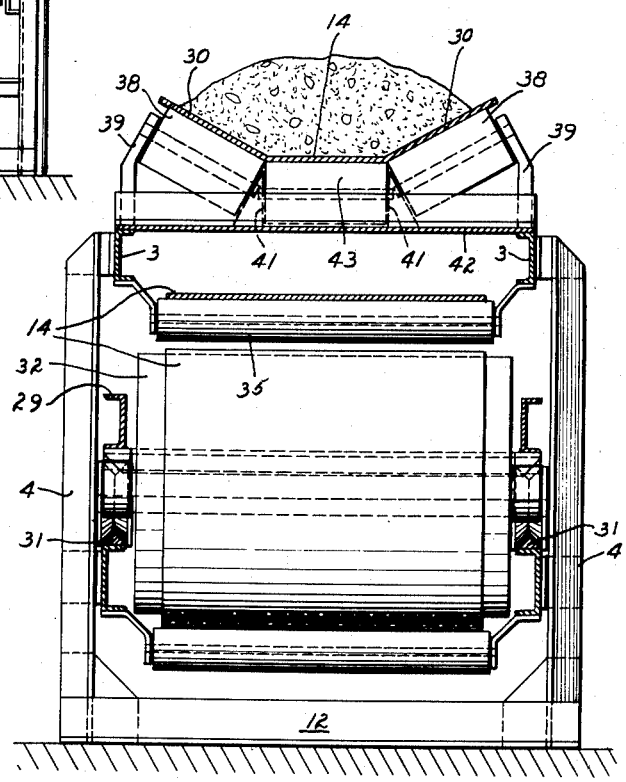
Figure 6 is a cross sectional view on the line 6—6 of Figure 1.

The opposed edge portions of the upper or load-carrying run 30 of the conveyor belt 14 are supported upon inclined rollers 38, mounted in brackets 39 and 41, here shown supported upon a horizontal plate 42 secured to the upper edges of the side frame members 3—3, as shown in Figure 6. The plate 42 preferably extends the full length of the upper run of the conveyor belt and prevents material dropping over the edges of the conveyor belt from falling onto the lower run of the belt, where it might interfere with the operation of the belt, or possibly cause damage thereto. Intermdiate, horizontally disposed rollers 43, similar to the rollers 38, are provided for supporting the intermediate portion of the conveyor belt, as illustrated in Figure 6.

Heavy duty conveyor belts of the character utilized in conveyors of this general type are frequently several hundred feet in length, and may be thirty-six inches or more in width. The belt may vary from three-eighths to one inch in thickness, and preferably made of a rubber composition suitably reinforced to resist the tensile strains to which the belt may be subjected under heavy loads.

A long conveyor belt may elongate as much as two per cent or more of its entire length, and to maintain such a belt at a constant tension under all load conditions, the carriage 29 supporting the belt takeup pulley 32 must have a relatively long traveling range.

The novel mechanism herein disclosed for actuating the carriage 29 to maintain the belt under constant tension under all operating conditions, comprises a series of sprockets, interconnected by a single chain, and a pneumatically operated member having an operating connection with said chain, whereby a multiplied action is imparted to the carriage, when said member is actuated, and whereby said mechanism is responsive to any variations in the tension imposed in the belt as a result of variations in the load carried by the belt, to automatically actuate said belt tensioning mechanism to constantly maintain the belt at substantially a uniform tension.

The sprocket and chain mechanism is best illustrated in Figures 1, 3, 7 and 8, and comprises a chain 44 having one end connected to a draft member 45 secured to the carriage 29. The chain extends from the draft member 45 in a direction towards the drive pulley 27, and has a running connection with a sprocket 46, shown operatively connected to a piston rod 47 by such means as a forked member 48, which also has mounted therein a relatively smaller sprocket 49. The opposite end of the piston rod 47 is secured to a piston 51, mounted for reciprocal movement in a cylinder 52. The cylinder 52 is preferably provided with diametrically opposed trunnions 53 supported in bearings secured to a pair of longitudinally extending, opposed channel members 54, disposed in spaced parallel relation, and extending from the right hand end of the structural frame 15 to the adjacent upright post 4, when viewed as shown in Figure 3. The trunnions 53 permit the cylinder to move slightly with reference to its supporting structure, and whereby the piston rod and cylinder are maintained in axial alignment.

Figure 8:
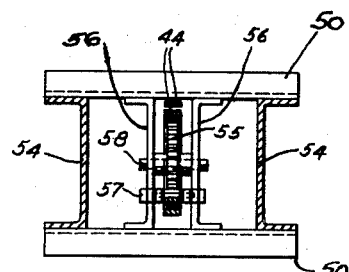
Figure 8 is an enlarged detail sectional view on the line 8—8 of Figure 1 with some of the parts omitted.

From the sprocket 46 the chain passes around a sprocket 55 shown mounted between fixed brackets 56 having cross members 58 securing them to the channels 54, as best illustrated in Figure 8. From the sprocket 55 the chain passes around the relatively smaller sprocket 49, and then back toward the sprocket 55 where its free end is anchored to the brackets 56, as indicated at 57 in Figure 8.

The unique orientation of the sprockets 46, 49, 55, in conjunction with the chain 44, carriage 29, and the piston rod 47, constitutes a very important feature of the present invention, in that they cooperate to provide a belt tensioning mechanism which is highly responsive to load variations imposed in the belt, and which maintains the belt at a constant tension under all operating conditions. The sprockets and chain function as a double block-and-tackle, except that it operates in reverse to that of a conventional block-and-tackle. By thus reversing the action of a conventional block-and-tackle, the carriage 27 is caused to travel a relatively greater distance per inch of travel of the piston 47, when the latter is actuated to impart traveling movement to the carriage and belt takeup pulley 32. This is a highly desirable feature, because by thus reducing the travel of the piston rod 47 relatively to the increased travel of the carriage, the piston rod 47 and its supporting piston 52 may be made comparatively small and compact in proportion to the movement which it is capable of imparting to the carriage 29, which results in compactness, and makes it possible to mount the piston rod and cylinder within the structural frame 15 without requiring said structural frame to be enlarged beyond that normally required to support the drive pulleys 27 and motor 22.

The cylinder 52 is in constant communication with an air supply tank 59 through a conduit 61 having an operating valve 62 mounted therein for controlling the circulation of the air between the air supply tank and cylinder 52. A conventional three-way valve may be utilized having an operating handle 63 which, when in the full line position shown in Figure 3, establishes maximum air circulation between the tank and cylinder, whereby the air may pass through the conduit 61 without restraint and thus render the mechanism highly responsive to belt variations. Should the conveyor installation be located near an air supply line, the air supply tank or reservoir 59 may be dispensed with. Such conditions may be found in underground installations.

The novel belt tensioning mechanism herein disclosed serves to maintain the conveyor belt under constant tension, regardless of load variations, particularly in the lower run of the conveyor belt. The tension maintained in the belt will also take up any elongation of the belt caused by stretching under varying loads, temperature changes, etc.

Belt tensioning mechanisms now in common use have not been particularly well adapted for underground belt installations. They have also been objectionable in some surface installations because of the inherent construction of the mechanism employed to maintain and support the belt takeup carriage and its movements. Conventional belt takeup mechanisms also require servicing at times which may be rather expensive because in some instances it may require partial dismantling of the apparatus.

By utilizing the novel belt tensioning mechanism herein disclosed, maintenance costs may be reduced to a minimum because of the elimination of the usual bulky weights, which are expensive and usually require considerable head room or space to allow for the necessary movement of the weight. Weight-operated belt tensioning mechanisms are also objectionable in that they are not readily responsive to load variations, because of the power required to overcome the inertia of the counterweight, when such weight must suddenly be moved to allow for elongation or shortening of the belt. This is particularly true in high tension belt applications operating under a horse power of one hundred or more.

By the utilization of the pneumatically operated belt takeup herein disclosed in a heavy duty belt conveyor such as referred to, all of the usual objectionable features inherent in conventional belt takeup mechanisms may be eliminated. It will also be noted that the entire mechanism, including the belt takeup carriage 29, chain and sprocket mechanism illustrated in Figures 1 and 3, the piston rod 47 and its supporting cylinder 52, and the air supply tank 59, because of their compactness, requires very little room when assembled in a structure such as shown at 15 in Figure 3. The mechanism is also very light in weight and therefore does not require that the structure 15 be heavily reinforced and strengthened, as is necessary when counterweights are used.

The pneumatically operated mechanism herein disclosed is particularly adaptable to underground installations because of its compactness. It may readily be used in most heavy duty belt conveyor installations, and will be found to provide a very efficient and practical mechanism of this general type. The mechanism is highly responsive to belt length changes since all moving parts are extremely light in comparison to the construction of a belt tensioning mechanism utilizing a heavy counterweight.

The block-and-tackle principle of operation (in reverse), employing roller chain and sprockets, achieves a high degree of mechanical efficiency, and results in the production of a belt tensioning mechanism which is instantly responsive to tensional variations in an endless conveyor belt, and is capable of automatically maintaining such a conveyor belt under a constant tension under all load conditions.

For example, if the carriage 29 should require a pull of eight thousand pounds, and had a traveling movement of twenty feet, a belt tensioning mechanism utilizing four strands of chain may adequately provide the necessary ratio of travel between the piston rod 47 and the travel of the carriage 29. If, however, a greater ratio is required in the traveling movement between the piston rod 47 and the carriage 29, then the number of strands of chain and the number of sprockets may be increased in the manner of a conventional multiple block-and-tackle, with the understanding, of course, that the mechanism operates with a reverse action to that of a conventional multiple strand block-and-tackle.

In an installation where the available air supply may not be sufficient, an air compressor may be utilized to supply the necessary air pressure. Such a compressor should be large enough to prevent excessive changes in air pressure when the piston rod moves between its extremes of travel. Such an air compressor need only be large enough to make up for air losses in the system, since once the supply of air has been brought up to the necessary operating pressure, such pressure need only be maintained.

As hereinbefore stated, the conduit 61 must be of ample size to allow free air circulation therethrough in order to cause the belt takeup mechanism to respond instantly to load variations which may effect the tension and elongation in the belt.

Should it become necessary to release the tension in the belt, such action may be quickly effected by simply releasing the air from the cylinder 52 by manipulation of the air control valve 62.

In the specification and accompanying drawings, the invention has been described and illustrated as utilized in a horizontal, heavy duty belt conveyor. It is to be understood, however, that the invention may be applied to other types and styles of belt conveyors where applicable, without departing from the scope of the invention.

The foregoing detailed description has been given for clearness of understanding only, and no unnecessary limitations should be understood therefrom, and the appended claims should be construed as broadly as permissible in view of the prior art.

I claim as my invention:

1. An endless belt conveyor comprising a supporting frame, a series of load supporting antifriction rollers mounted on said frame and cooperating to support the load-carrying run of the conveyor belt, a drive pulley, a tail pulley, a snub pulley, a belt takeup pulley, a carriage for supporting the belt takeup pulley and whereby said belt takeup pulley is capable of elongated travel in a direction to take up slack in the conveyor belt, a cylinder having a piston therein, a pair of sprockets mounted in alinement with and one ahead of the other, said sprockets being operatively connected to and movable with the piston, a third sprocket mounted in spaced alined relation with said pair of sprockets and on the conveyor supporting structure, the intermediate one of said sprockets being smaller than the outer sprockets, and a flexible chain member, having running connections with said sprockets and having one end secured to the carriage and its opposite end anchored to a fixed support, whereby when the piston is actuated, said chain and sprockets will cooperate to move the carriage in a direction to tension the belt, said carriage being moved a relatively greater distance than said piston.

2. In combination with a heavy duty conveyor including a frame, a drive pulley, a tail pulley, a snub pulley, and an endless belt, said pulleys being carried by said frame and said belt being carried on said pulleys; means for maintaining a constant predetermined tension on said belt comprising a carriage longitudinally reciprocably carried by said frame, said snub pulley being rotatably supported by said carriage to move therewith, an air cylinder carried by said frame and extending in longitudinal alinement therewith, a piston in said cylinder, a piston rod connected with said piston to be reciprocated therewith and extending outwardly from said cylinder, means connecting said cylinder with a source of constant air pressure, a plurality of sprockets carried one behind the other and in spaced alined relation, the intermediate one of said sprockets being smaller than the outer ones of said sprockets, some of said sprockets being carried by and movable with said piston rod and another of said sprockets being carried by said frame, and a chain having one end anchored to said frame and a running connection around each of said sprockets beginning with the smaller of said sprockets and continuing to the largest of said sprockets to form a block-and-tackle the elements of which are disposed in reverse order to corresponding elements of conventional block-and-tackle, the opposite end of said chain being connected to said carriage whereby air pressure in said cylinder will apply a constant tension on said belt, and the movement of said carriage by said piston and cylinder is relatively greater than the movement of said piston and a relatively great amount of slack in said belt may be accommodated by a relatively short piston stroke.

3. In combination with a heavy duty conveyor including a frame, a drive pulley, a tail pulley, a snub pulley, and an endless belt, said pulleys being carried by said frame and said belt being carried on said pulleys; means for maintaining a constant predetermined tension on said belt comprising a carriage longitudinally reciprocably carried by said frame, said snub pulley being rotatably supported by said carriage to move therewith, an air cylinder carried by said frame and extending in longitudinal alinement therewith, a piston in said cylinder, a piston rod connected with said piston to be reciprocated therewith and extending outwardly from said cylinder, means connecting said cylinder with a source of constant air pressure, an elongated forked member carried by said rod, a plurality of sprockets carried by said forked member in alinement with each other, said sprockets being one behind the other, the outermost one of said sprockets with respect to said forked member being smaller than the other of said sprockets, a third sprocket carried by said frame in spaced alinement with said pair of sprockets, and a chain having one end anchored to said frame and a running connection around each of said sprockets to form a block-and-tackle the elements of which are disposed in reverse order to corresponding elements of conventional block-and-tackle, the opposite end of said chain being connected to said carriage whereby air pressure in said cylinder will apply a constant tension on said belt, and the movement of said carriage by said piston and cylinder is relatively greater than the movement of said piston and a relatively great amount of slack in said belt may be accommodated by a relatively short piston stroke.

4. In combination with a heavy duty conveyor including a frame, a drive pulley, a tail pulley, a snub pulley, and an endless belt, said pulleys being carried by said frame and said belt being carried on said pulleys; means for maintaining a constant predetermined tension on said belt, said means comprising a carriage longitudinally reciprocably carried by said frame, said snub pulley being rotatably supported by said carriage to move therewith, said belt being looped around said snub pulley in at least a 180° wrap, an air cylinder carried by said frame and extending in longitudinal alinement therewith, a piston reciprocable in said cylinder, a piston rod connected with said piston to be reciprocated therewith and extending outwardly from said cylinder, means connecting said cylinder with a source of constant air pressure, an elongated forked member carried by said rod, a pair of sprockets carried by said forked member in alinement with each other and with said rod, one of said sprockets being behind the other, the outermost one of said sprockets with respect to said forked member being smaller than the other of said sprockets, a third sprocket carried by said frame in spaced alinement with said pair of sprockets, and a chain having one end anchored to said frame and a running connection first around said smaller sprocket then around said third sprocket then around the remaining one of said sprockets to form a block-and-tackle the elements of which are disposed in reverse order to corresponding elements of conventional block-and-tackle, the opposite end of said chain being connected to said carriage after it leaves said remaining one of said sprockets whereby air pressure in said cylinder will apply a constant tension on said belt, and the movement of said carriage by said piston and cylinder is relatively greater than the movement of said piston and a relatively great amount of slack in said belt may be accommodated by a relatively short piston stroke.

LEWIS C. ERICKSON.

REFERENCES CITED

The following references are of record in the file of this patent:

UNITED STATES PATENTS

| Number | Name | Date |
|---|---|---|
| 269,994 | Bailey | Jan. 2, 1883 |
| 1,523,988 | Vance | Jan. 20, 1925 |
| 2,452,980 | Beltz | Nov. 2, 1948 |